(12) United States Patent
Geer

(10) Patent No.: US 11,100,163 B1
(45) Date of Patent: Aug. 24, 2021

(54) PHOTOGRAPHIC MEMORY

(71) Applicant: James L. Geer, Hoover, AL (US)

(72) Inventor: James L. Geer, Hoover, AL (US)

(73) Assignee: Mimzi LLC, Hoover, AL (US)

( * ) Notice: Subject to any disclaimer, the term of this patent is extended or adjusted under 35 U.S.C. 154(b) by 186 days.

(21) Appl. No.: 16/205,073

(22) Filed: Nov. 29, 2018

Related U.S. Application Data

(60) Continuation of application No. 15/727,045, filed on Oct. 6, 2017, now abandoned, which is a continuation of application No. 13/900,495, filed on May 22, 2013, now Pat. No. 9,792,361, which is a division of application No. 12/181,956, filed on Jul. 29, 2008, now Pat. No. 8,775,454.

(51) Int. Cl.
*G06F 16/632* (2019.01)
*G06F 16/24* (2019.01)
*G10L 15/26* (2006.01)

(52) U.S. Cl.
CPC ......... *G06F 16/634* (2019.01); *G06F 16/24* (2019.01); *G10L 15/26* (2013.01)

(58) Field of Classification Search
CPC ........ G06F 16/634; G06F 16/24; G06F 16/00; G06F 16/954; G06F 16/9537; G06F 16/738; G10L 15/26; H04W 4/025; H04W 4/029; H04W 4/23; H04L 67/22; H04M 3/4878; H04M 2242/30; H04M 3/42348
USPC ...................................................... 707/600
See application file for complete search history.

(56) References Cited

U.S. PATENT DOCUMENTS

| | | | | |
|---|---|---|---|---|
| 2005/0192746 A1* | 9/2005 | King | ................. | G08G 1/0965 701/468 |
| 2009/0199114 A1* | 8/2009 | Lewis | ................. | H04W 4/21 715/763 |
| 2011/0081921 A1* | 4/2011 | Casey | ................. | H04L 67/04 455/456.3 |
| 2011/0207480 A1* | 8/2011 | Friedmann | ......... | G06F 16/9535 455/457 |

FOREIGN PATENT DOCUMENTS

EP          1376059 A2 *   1/2004   ............. H04W 4/21

* cited by examiner

*Primary Examiner* — Evan Aspinwall
(74) *Attorney, Agent, or Firm* — Hoffberg & Associates; Steven M. Hoffberg

(57) ABSTRACT

A system and method for collecting data may include a data collection device to obtain the data from a user, an apparatus for obtaining metadata for each word of the data from the user, an apparatus for obtaining a searchable transcript of the data and a device to store the searchable transcript. The metadata may be date data, time data, name data or location data and the data collection device may include a speech recognition engine to translate speech into searchable words. The speech recognition engine may provide a confidence level corresponding to the translation of the speech into searchable words, and the speech recognition engine may distinguish a first user and a second user in order to provide a first searchable transcript for the first user and a second searchable transcript for the second user. An ad transcript may be added to the searchable transcript, and the searchable transcript may be placed in a centralized community search database.

22 Claims, 6 Drawing Sheets

PHOTOGRAPHIC MEMORY

CROSS REFERENCE TO RELATED APPLICATIONS

The present Application is a Continuation of U.S. patent application Ser. No. 15/727,045, field Oct. 6, 2017, now pending, which is a Continuation of U.S. patent application Ser. No. 13/900,495, filed May 22, 2013, now U.S. Pat. No. 9,792,361, issued Oct. 17, 2017, which is a Continuation of U.S. patent application Ser. No. 12/181,956, filed Jul. 29, 2008, now U.S. Pat. No. 8,775,454, issued Jul. 8, 2014, the entirety of which are expressly incorporated herein by reference in its entirety.

This Application is related to U.S. patent application Ser. No. 14/664,481, filed Mar. 21, 2015, now U.S. Pat. No. 9,128,981, issued Sep. 8, 2015, which is a Continuation of U.S. patent application Ser. No. 14/321,332, filed Jul. 1, 2014, now Abandoned, which is a Continuation of U.S. patent application Ser. No. 12/181,956, filed Jul. 29, 2008, now U.S. Pat. No. 8,775,454, issued Jul. 8, 2014, the entirety of which are expressly incorporated herein by reference in its entirety.

FIELD OF THE INVENTION

The present invention is directed, in general, to using a phone to record phone calls, meetings and dictation, and for storing the metadata, audio and/or speech recognized text into a centralized content searchable repository, so that all or most of all conversations and near everything seen or read can be searched with a single query, somewhat like the capabilities of a hypothetical person with a "photographic memory".

The default operation for the phone is for this recorded speech and other content is to be labeled private, so only the phone user can access the recorded speech, but the phone user may designate certain of the content to be public, to be shared with anyone via the Internet, in what is known as Location Blogging. This could also be called a community or collective photographic memory, where the content is contributed by multiple members of the community.

BACKGROUND OF THE INVENTION

Many people believe they could be more productive if they could remember everything they have read or seen and all the conversations they have had with others. These are the capabilities of a hypothetical person with a "photographic memory".

If a person converses by email, this person has a searchable record of their conversations. This person can now search using the search features provides by their email software, or the search facilities provided by an outbound program, such as the popular Google Desktop Search or by a document or content management software.

Thus, a person has a proxy for a "photographic memory" for email conversations. All their email conversations are in one place and can be searched on demand, to "remember" any conversation, in a matter of a couple of seconds.

However, many conversations are by phone or in person and these are typically not recorded, and if recorded, are not searchable, and if searchable, are not searchable with the same search that searches email. Therefore, unlike a hypothetical person with a "photographic memory", there is no centralized computerized repository for all conversations and everything seen or read, that can be searched with a single query.

Ideally, a person should be able to record and search, with one query, anything discussed in their phone calls and face-to-face conversations, as well as anything they have seen or read, including emails and text messages.

A salesman should be able to talk with a prospect on his cell phone and the call be recorded. With the present invention, the audio can be automatically sent to a server for speech recognition and then the audio and speech-recognized text and call date, time and calling party names sent to a searchable computer repository.

A professional should be able to use her cell phone as a recording device (without making a call while recording) to record the audio of a meeting and then take a picture of her handwritten notes and the whiteboard. With the present invention, the audio could be automatically sent to a server for speech recognition, and the audio and speech-recognized text sent to a searchable computer repository.

If a mobile phone user sees a traffic jam, or a hazard in the road, such as a stalled vehicle, or a driver driving the wrong way on the Interstate, the mobile phone user should be able to send a spoken message, with speech-recognized text and location data, to a community searchable database, from which others can be instantly warned of the hazard, via text message, voice message, email, warning icon on the GPS map in their car or on their phone, digital signs on the road, etc.

Therefore, what is needed in the art is an easy and unobtrusive way to record and search audio from phone calls and face-to-face conversations, as well as record and search things seen, such as a whiteboard with a schematic of a new product, or an article in a publication. These should be recorded to a centralized computerized database that can be searched with one query.

A Conversation may be defined as a conversation with one or multiple other people, or it can be a person dictating.

SUMMARY OF THE INVENTION

A system for collecting data may include a data collection device to obtain the data from a user, an apparatus for obtaining metadata for each word of the data from the user, an apparatus for obtaining a searchable transcript of the data and a device to store the searchable transcript.

The metadata may be date data, time data, name data or location data and the data collection device may include a speech recognition engine to translate speech into searchable words.

The speech recognition engine may provide a confidence level corresponding to the translation of the speech into searchable words, and the speech recognition engine may distinguish a first user and a second user in order to provide a first searchable transcript for the first user and a second searchable transcript for the second user.

An ad transcript may be added to the searchable transcript, and the searchable transcript may be placed in a centralized community search database.

A method for collecting data may include the steps of obtaining the data from a user, obtaining metadata for each word of the data from the user, obtaining a searchable transcript of the data, and storing the searchable transcript.

The metadata may be date data, time data, name data or location data, the method may include the step of operating a speech recognition engine to translate speech into searchable words.

A confidence level may be provided corresponding to the translation of the speech into searchable words, and the speech recognition engine may distinguish a first user and a second user in order to provide a first searchable transcript for the first user and a second searchable transcript for the second user.

An ad transcript may be added to the searchable transcript, and the method may place the searchable transcript in a centralized community search database.

BRIEF DESCRIPTION OF THE DRAWINGS

The invention may be understood by reference to the following description taken in conjunction with the accompanying drawings, in which, like reference numerals identify like elements, and in which.

DETAILED DESCRIPTION OF THE PREFERRED EMBODIMENTS

Figure 1:
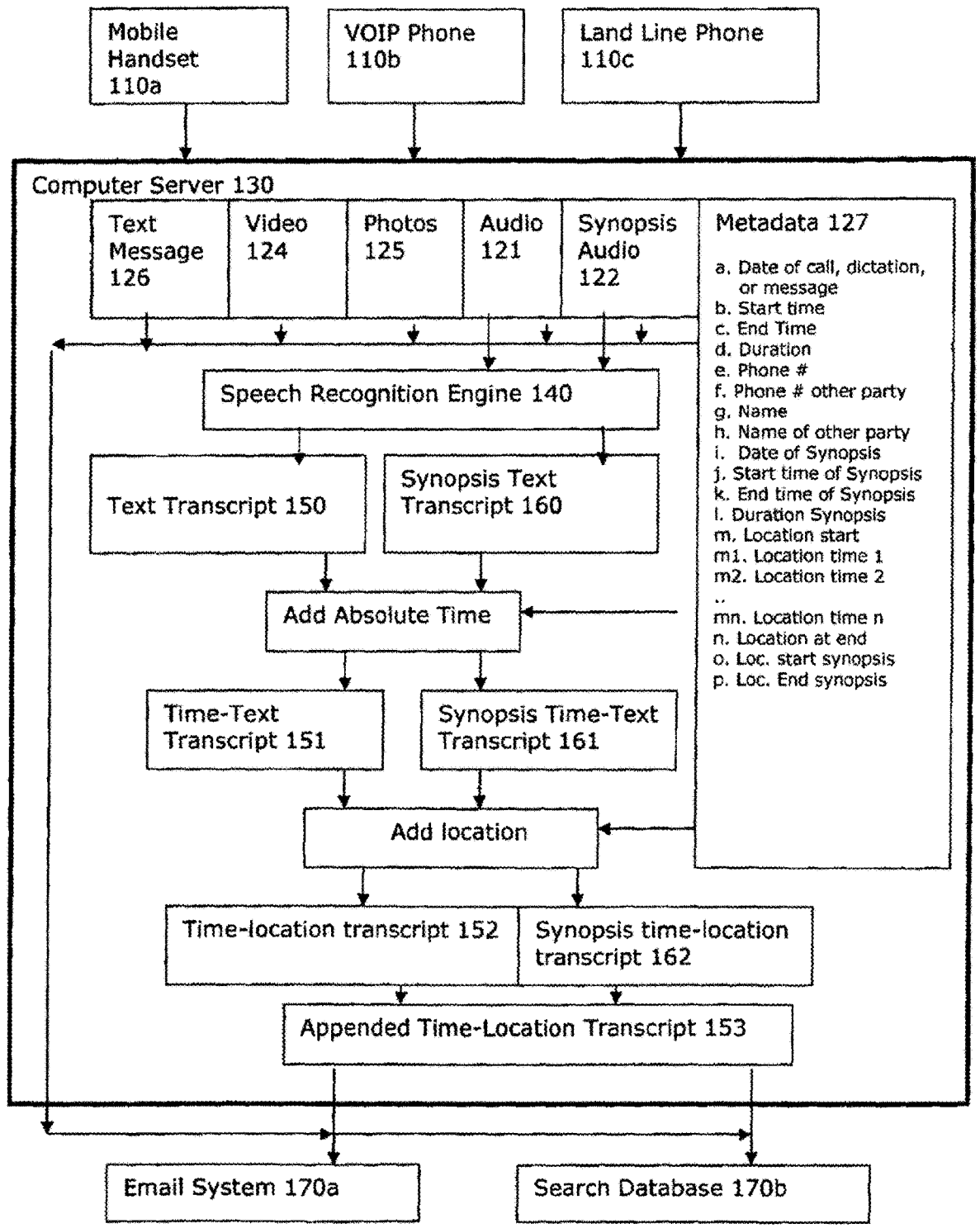
FIG. 1 illustrates a block diagram with a computer server for speech recognition and intermediary processing.

To address the above-discussed deficiencies of the prior art in providing a "photographic memory", the present invention provides for using a cell phone or other phone to record audio from both phone calls as well as face-to-face Conversations, and provides speech recognition so the Conversations can be searched.

For recording things seen, such as a schematic on a whiteboard, hand-written notes on a notepad, or an article in a publication, a camera phone can be used to take a picture of the whiteboard, notepad, or each page of the article. Also, many camera phones include video, for example at 15-30 pictures (frames) per second (FPS), so a video can be recorded, and the present invention provides for sending them to the same repository as Conversations.

Camera phones may have a 5-megapixel resolution and 30 FPS, and the resolution is expected to continue to increase over these levels.

When a person takes a picture or video, they will be prompted by the phone and asked to provide a brief description of the picture or video, and this description or synopsis may be used to index the picture or video so it can be searched by any word or phrase in the description. The person can speak the description, or type the description on a keyboard.

The phone records the date and time and location (e.g., by GPS) of each Conversation, picture or video recorded, so the Conversations, pictures and video can be searched by date, time and location, as well as the speech-recognized text of the recorded audio or synopsis.

If the camera phone picture or video is sent to the repository while a Conversation is being recorded, the person may not be prompted for a description of the picture or video, and the picture or video is added as an attachment to the record of the Conversation. When a person searches on any word or phrase in the Conversation, they can click to the see attached pictures and videos.

The searchable database can be a person's email system or their customer relationship management software or their document management software, or their enterprise content management software.

Also, newer computer operating systems, such as Windows Vista, may provide search capabilities for files and emails, and there are utility programs, such as Google Desktop search, that provide search capabilities.

The recorded audio and speech-recognized text can also be sent to a specialized "audio search" database, in which there is a link between each text (speech-recognized) word and the elapsed time (byte offset) in the audio where that word can be heard.

For each text word, the elapsed time is stored, so a user can click any text word and hear the audio, starting at the time in the audio when that word was spoken.

For phone calls, the present invention may use speech recognition to generate a transcript of the Conversation and sends the call information and transcript to the phone user's email system or Search Database, where Search Database is defined as a Customer Relationship Management system, Document Management system, Enterprise Content Management system, or "specialized audio search" database, or similar repository for storing and searching the audio, metadata (such as caller name and date of call) and/or speech-recognized text of the audio.

The Search Database typically may include a SQL relational database, for the metadata and audio, video and photos, and an inverted text file, to speed text searching.

The Search Database can be on the user's own computer or server, or it could be a hosted service "in the Cloud", available over the Internet, such as that provided by Salesforce.com or Amazon.

For face-to-face meetings, the phone can be used as a dictation device, to record, after the meeting, a synopsis of the meeting (without making an actual call), and the audio will be sent to a server, speech recognized, and then sent to the phone user's email system or Search Database. Alternatively, the user could use their phone to record the entire meeting.

For example, the user could attend a design meeting for a quantum computer, and at the end of the meeting record a synopsis of the meeting and take a picture or video (with their camera phone) of the white board where a schematic was drawn. The user could also take a picture of pages from a technical journal article about quantum computers. All of this information could be sent to their Search Database or email system.

Phone may be defined as a mobile handset, such as a cell phone, computer with VOIP (voice over Internet) phone service, land-line phone or similar telephony device or text message over a phone.

In 2008, Intel announced wireless Internet pocket-size computers, called Mobile Internet Devices, which can be used as a computer, and with VOIP service, as a phone.

In addition to the traditional telephony providers, such as Verizon, land-line phone service and phones are provided by Cable TV providers, such as Time Warner.

These land-line phones may have wired or cordless handsets with a base station, such as the popular 2.4 GHz cordless handsets. The cordless handsets may have a camera for photos and video, and the base station may be in each home (subscriber premises).

The base station on subscriber premises is what differentiates a cordless telephone from a mobile phone. Current cordless telephone standards, such as PHS and DECT, have blurred the once clear-cut line between cordless and mobile telephones by implementing cell handover and other features. In these models, base stations are maintained by a commercial mobile network operator and users subscribe to the service.

For programming mobile phones, Google offers the Android SDK (software development kit), and the first Android phones are scheduled to ship in 2008. In 2008, Apple began to offer an SDK for it's IPhone. Symbian offers an SDK for a wide variety of phones. This programming may be used to implement the teachings of the present invention.

Here's an overview of operation of operation of the present invention.

The user makes or receives a Phone call.

At end of the call, the user is optionally prompted to record a short synopsis of the call, for an "Action List" or main points.

The present invention sends the call data, including the caller and callee name and phone number, date, time, location, and audio of synopsis as well as (optionally) full audio of call to a computer server.

The audio of the phone user is recorded from the microphone which may include a high sampling rate and high-quality compression, and sent via TCP/IP, instead of being sent over a lower-quality voice channel.

The present invention performs speech recognition of the synopsis and full audio and then emails, from the server, this text in the body of the email to the user's email system, with the synopsis audio and full audio as attachments, so the user can search to find calls and read the transcript of the synopsis or full call and listen to recorded audio of the synopsis or full call if they need to.

Or, the call data may be sent, with the above speech-recognized text and audio attachments, to a Search Database, instead of sending it to their email system.

For those wanting the call data sent directly to their email, instead of first to a server, the present invention can send the call info directly from the Phone to their email. Also, the present invention can use the speech recognition provided on the phone to do speech recognition before the email is sent, but this phone-based speech recognition may be of lesser quality than server-based speech recognition.

Call logging in accordance with the teachings of the present invention may also be good for billing of time to clients for CPAs, lawyers, tech support, etc.

For face-to-face meetings, the same approach may be used, except no phone call may be made. The Phone may be used as a recording device, for audio and pictures and video, as discussed in quantum computer example above.

For users desiring an ad-supported service instead of a subscription-based service, the present invention can provide for targeted ads. The present invention can use the speech-recognized text, to target the ad to something (a keyword) mentioned one or more times in the conversation.

Also, the present invention can use the user-provided (or phone company provided) demographics of the Phone user to target the ad, including age, sex, income, job title, interests, etc.

The ad may be added to the recorded audio (synopsis and full call audio) as well as the speech-recognized text. Or, the user could see the ad on their phone or hear the ad before they record their synopsis.

For legal reasons, the default option would be to record only the phone user's side of the call, and not record the other party unless the other party gave their permission. Alternatively, where legal, both sides of the conversation could be recorded.

The voice-recognized call text transcripts may contain a timestamp indicating the time or byte offset within the call audio where each voice recognized-word is found.

The location coordinates can be added to the timestamp in the text transcripts, so the text transcripts have a record of not just where, in the audio file, each word can be found, but where the user was when the user spoke the word.

This location-spoken data can be used, e.g., in the selection of ads to present to the user. If the phone user is discussing a 100 inch Panasonic flat panel TV, the presented ad could be an ad for the electronics store nearest the user, at the time the user mentioned the 100 inch Panasonic TV.

The location-spoken data could also be used in "post action" review for police or first responder actions, military fire fights, or mockups or trials of same, so the reviewer may know not just all the words recorded, but where each phone user was when they spoke each word.

Computer hard disk capacity has been doubling each 18 months for many years, and this is expected to continue for at least the next 10 years. In 2008, an inexpensive 3.5-inch hard disk has a capacity of 1 terabyte. In ten years, an inexpensive hard drive may hold 64 terabytes.

Mobile phone bandwidth is increasing as well. For example, NTT DoCoMo, Inc. has taken 4G mobile broadband standard Long-Term Evolution (LTE) out of the lab and shown 250 Mbit/s for the downlink.

The data sent to the repository can also include data picked up by using the Phone as a sensor, e.g., to record and transmit wireless data from another Phone or an adjacent automobile. This could be useful for a rolling ad-hoc surveillance or vehicles and people.

For example, all new vehicles may be mandated to have a tire pressure monitoring system (TPMS), which periodically sends a wireless signal to the vehicle to which the tires are mounted.

In a typical TPMS, each wheel of the vehicle may contain a device (TPMS sensor), usually attached to the inflation valve, that measures air pressure.

Each sensor transmits this information, usually once per minute, to the on-board computer in the vehicle. To differentiate between its own wheels and wheels of the vehicle in the next lane, each TPMS sensor may contain a unique id, for each vehicle. The majority of TPMS sensors may transmit information in clear text using the assigned radio frequencies 315 MHz or 433 MHz or other appropriate frequency.

The TPMS may be automatically recorded (by a Phone) from passing vehicles, and may be sent to the Search Database. A community of users may share this TPMS data with a central service (such as the government), or a central service may search each user's TPMS data, so the central service may map the locations where all "detected" vehicles were at any time they were detected.

The phone sensor may also detect and record Bluetooth signals from adjacent vehicles or people, or "drive by wireless" signals in vehicles.

As shown in FIG. 1, the data which may include the audio 121, synopsis audio 122, video 124, photos 125, text messages 126 and metadata 127 recorded on or streamed live and which may have been received from a data collection device including Mobile Handset Phone 110a, Voice Over IP (VOIP) Phone 110b or land line phone 110C are transmitted via the Internet or intranet, e.g., using TCP/IP for lossless or at least high-quality data transmission, to the computer server 130.

If the event was a phone call, the metadata includes date and time of call, phone number of both parties to the call, names of both parties, and Location of phone user, such as coordinates provided by GPS or cell-phone-tower triangulation.

If the event was not a call, e.g., the data was obtained from a dictation or recording of a meeting, the metadata corresponding with this data may include date and time of recording, phone number of phone user, name of phone user, and location of phone user.

If the data was obtained from a text message, the metadata corresponding to this data may include date and time of message, names and message IDs of both parties, and the Location of phone user.

Once the data is on the computer server 130, the data for example the audio 121 and synopsis audio 122 may be processed by a speech recognition engine 140, such as the Nuance Communications speech recognition engine, if the data was audio 121 a text transcript 150 of the call may be generated or if the data was synopsis audio, dictation audio and text transcript may be generated by the synopsis text transcript 160.

The speech recognition engine may provide time offset within the audio based upon where each word is found. Consequently, the text transcript 150 and synopsis text transcript 160 may contain a timestamp indicating the relative time or byte offset within the audio 121 and synopsis audio 122 where each voice recognized-word is found.

The speech recognition engine can also provide a confidence level for each word, to show the presumed correctness of each speech-recognized word.

The relative time or byte offset may be used to hear the audio of the word while viewing the text of the word. This may be used, e.g., to verify the accuracy of the voice-recognized text.

For applications where the actual time spoken for each word is important, e.g., for video and audio surveillance, the start date and time of the call or dictation may be read from metadata 127.

The start date 127a and start time 127b may be added to the relative timestamp 150a for each word in text transcript 150 to produce time-text transcript 151 with an absolute date/timestamp for each word, so that the user may obtain a text word, a relative time offset, and an absolute date/time for each word.

The synopsis start date 127i and synopsis start time 127j can be added to the relative timestamp 160a for each word in the synopsis text transcript 160 to produce synopsis time-text transcript 161 with an absolute date/timestamp for each word, so that you have a text word, a relative time offset, and an absolute date/time for each word.

The user may configure the present invention to record or send new Location data any time the user's location changes by a certain distance, such as 2 meters.

The location coordinates 127m1, 127m2, . . . 127mn read from metadata 127 can be added next to each timestamp in the time-text transcript 151 to produce time-location transcript 152, so the time-location stamps for each word, i.e., a record of where the phone user was when the phone user spoke each word may be generated for the user.

The synopsis location coordinates 127n read from metadata 127 may be added next to each word in the synopsis time-text transcript 161 to produce synopsis time-location transcript 162, so time-location stamps for each word, i.e., a record of where the phone user was when the phone user spoke each word may be generated by the user.

In order to simplify searching, so that there may be only one searchable text document for each call or dictation, the time-location transcript 152 is appended to the end of the synopsis time-location transcript 162 to produce the appended time-location transcript 153.

The call transcript timestamps may have an indicator, such as a flag byte, that can be used to differentiate them from the synopsis timestamps, so when the user views the appended time-location transcript 153 and the user clicks to hear the audio, the correct related audio can be accessed, i.e., either the call audio 121 or synopsis audio 122.

Text Transcript 150 and synopsis transcript 160 may want the plain speech-recognized text first in the transcript, followed by the same speech-recognized text with the relative timestamp next to each word, so users who are viewing the text with their regular email viewer can read the text without seeing the timestamps.

The subsequent stages of adding the absolute time to produce time-text transcript 151 and Synopsis time-text transcript 161, adding the locations to produce Time-location transcript 152 and synopsis time-location transcript 162, would add the actual-time stamp and location-stamp to the time stamped part of the transcripts, i.e., the second copy of the words that have timestamps added next to each word.

Instead of the time stamped part of a transcript being sent at the bottom of the text transcript, it may be sent as an attachment.

For calls and dictation, the appended time-location transcript 153, along with attached call audio 121, attached synopsis audio 122, attached video 124, attached photos 125, and metadata 127 may be transmitted from the computer server 130 via the Internet or intranet, e.g., using TCP/IP for near lossless or at least high-quality data transmission, to the email system 170a or Search Database 170b of the user.

For text messages, the text message 126, along with attached video 124, attached photos 125, and metadata 127 may be transmitted from the computer server 130 via the Internet or intranet, e.g., using TCP/IP for near lossless or at least high-quality data transmission, to the email system 170a or Search Database 170b of the user.

Figure 2:
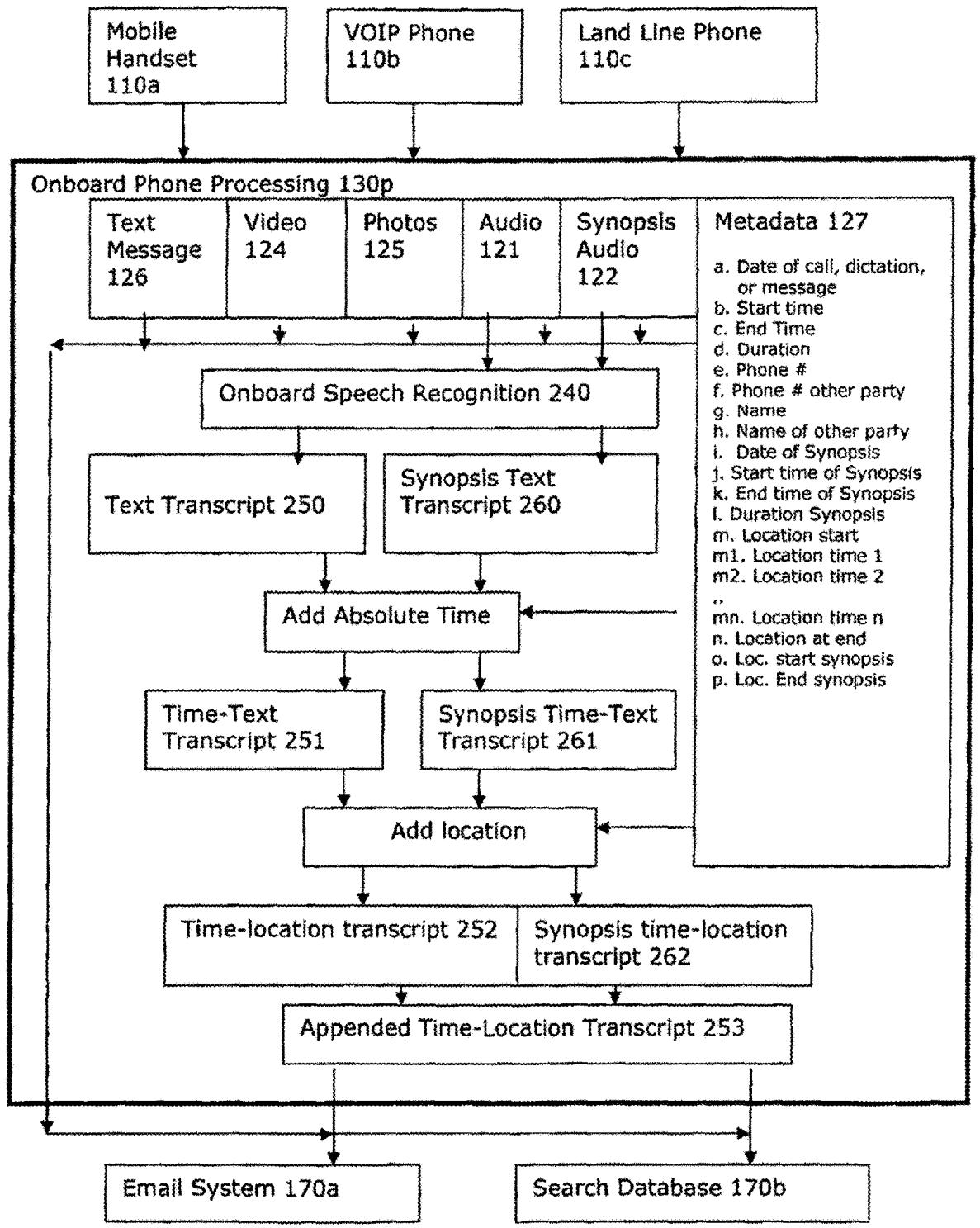
FIG. 2 illustrates a block diagram with speech recognition and intermediary processing onboard the Phone.

FIG. 2 illustrates the speech recognition may be performed on the Phone instead of the server, this phone-based speech recognition may be of lesser quality than server-based speech recognition due to many factors including the processing capability of the phone. The sequence of operation in FIG. 2 is approximately the same as in FIG. 1.

As shown in FIG. 2, on the Mobile Handset Phone 110a, Voice Over IP (VOIP) Phone 110b or land line phone 110C, the audio 121 and synopsis audio 122 are processed by an onboard speech recognition engine 240, to generate a text transcript 250 of the call or dictation audio and text transcript 260 of the synopsis audio.

The text transcript 250 and synopsis text transcript 260 can contain a timestamp indicating the time or byte offset within the audio 121 and synopsis audio 122 where each voice recognized-word is found.

The relative time or byte offset can be used to hear the audio of the word while viewing the text of the word. This could be used, e.g., to verify the accuracy of the voice-recognized text.

For applications where the actual time spoken for each word may be important, e.g., for video and audio surveillance, the start date and time of the call or dictation may be read from metadata 127.

The start date 127a and start time 127b may be added to the relative timestamp 250a for each word in text transcript 250 to produce time-text transcript 251 with an absolute date/timestamp for each word, so that you have a text word, a relative time offset, and an absolute date/time for each word.

The synopsis start date 127i and synopsis start time 127j may be added to the relative timestamp 260a for each word in the synopsis text transcript 260 to produce synopsis time-text transcript 261 with an absolute date/timestamp for each word, so that you have a text word, a relative time offset, and an absolute date/time for each word.

The user may configure the present invention to record or send new Location data any time the user's location changes by a certain distance, such as 2 meters.

The location coordinates 127m1, 127m2, ... 127mn read from metadata 127 can be added next to each word in the time-text transcript 251 to produce time-location transcript 252, so you have time-location stamps for each word, i.e., a record of where the phone user was when the phone user spoke each word.

The synopsis location coordinates 127n read from metadata 127 can be added next to each word in the synopsis time-text transcript 261 to produce synopsis time-location transcript 262, so you have time-location stamps for each word, i.e., a record of where the phone user was when the phone user spoke each word.

In order to simplify searching, there may be only one searchable text document for each call or dictation, the call time-location text transcript 252 may be appended to the end of the synopsis time-location text transcript 262 to produce the appended time-location transcript 253.

The call transcript timestamps have an indicator, such as a flag byte, that can be used to differentiate them from the synopsis timestamps, so when the user views the time-location text transcript 253 and clicks to hear the audio, the correct related audio can be accessed, i.e., either the call audio 121 or synopsis audio 122.

Time-location text transcript 252 and synopsis time-location transcript 262 may have the plain speech-recognized text first in the transcript, followed by the same speech-recognized text with the timestamps next to each word, so users who are viewing the text with their regular email viewer can read the text without seeing the timestamps.

The time stamped part of a transcript may be placed at the bottom of the text transcript, the time stamped part of the transcript may be sent as an attachment.

For calls and dictation, the appended time-location transcript 253, along with attached call audio 121, attached synopsis audio 122, attached video 124, attached photos 125, and metadata 127 recorded on or streamed live from Mobile Handset Phone 110a, Voice Over IP (VOIP) Phone 110b or land line phone 110C may be transmitted via the Internet or intranet, e.g., using TCP/IP for nearly lossless or at least high-quality data transmission, to the email system 170a or Search Database 170b of the user.

For text messages, the text message 126, along with the attached video 124, attached photos 125, and metadata 127 which may be recorded on or streamed live from Mobile Handset Phone 110a, Voice Over IP (VOIP) Phone 110b or land line phone 110C may be transmitted via the Internet or intranet, e.g., using TCP/IP for lossless or at least high-quality data transmission, to the email system 170a or Search Database 170b of the user.

Speech recognition may be speaker independent, in which a generic trained vocabulary is used for speech recognition, instead of a using a trained speech recognition in which each speaker trains the system for their own speech.

Speech recognition may be more accurate for speakers who have trained the system with samples of their own speech.

The speech recognition may be more accurate if a defined vocabulary is specified, such as legal and medical.

Figure 3:
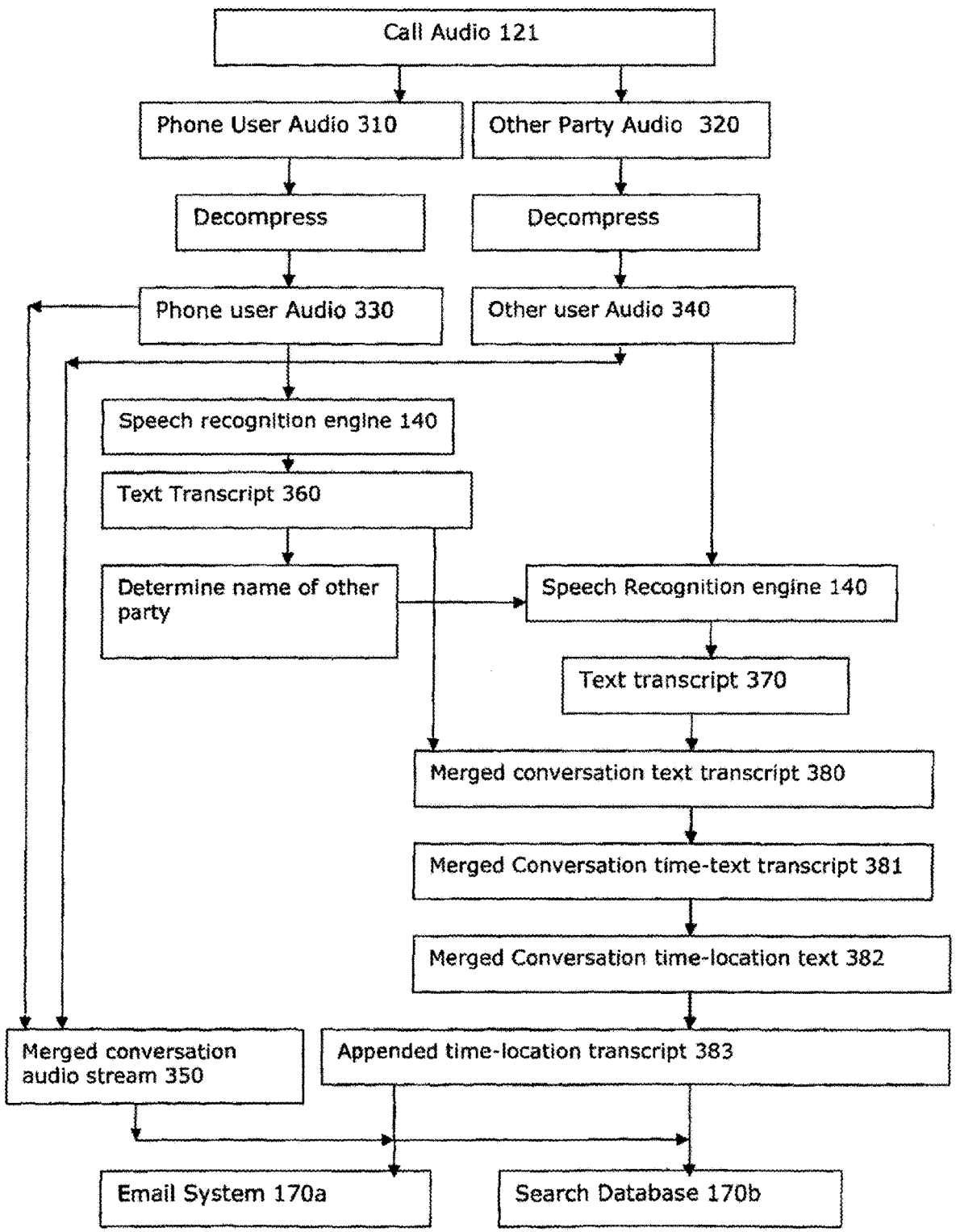
FIG. 3 illustrates using the caller ID, address book, and speech recognized text of the phone user, to determine the name of the other party, for speech recognition of the other party's speech.

Therefore, as shown in FIG. 3, the present invention provides for the identification of each speaker and the use of the speaker identification by the speech recognition engine to improve speech-recognition accuracy. The teaching shown in FIG. 3 can be used in conjunction with the teaching shown in FIGS. 1 and 2.

The call audio 121 may include the audio 310 of the phone user which may be picked up from a (preferably) noise canceling microphone on the Phone, and the audio 320 of the other party to the call. The audio 320 of the other party might be of lesser quality than the phone user's audio, e.g., because it is being transmitted over a voice channel that is not only lossy but limited as to high and low frequencies it transmits.

The voice phone channel can also be noisy, e.g., because of a bad phone connection, common for cell phones in certain locations.

The two speakers may be differentiated by a first and second audio streams 310 and 320, which may be are decompressed into the first and second audio streams 330 and 340, so the speech recognition engine can use the Speech Recognition training set for the first and second speaker in order to provide individual speech recognition for each speaker, to increase speech recognition accuracy.

Audio may be encoded at different sampling rates (i.e. samples per second—the most common being: 8 kHz, 16 kHz, 32 kHz, 44.1 kHz, 48 kHz and 96 kHz), and different bits per sample (the most common being: 8-bits, 16-bits or 32-bits).

Speech recognition engines may work best if the acoustic model they use was trained with speech audio which was recorded at the same sampling rate/bits per sample as the speech being recognized.

Therefore, the present invention may provide for voice-recognition training over the same device that will be used for recording the audio of the calls.

For voice recognition from mobile handsets, the present invention provides for training of the voice-recognition engine from the mobile handset, for land-line use the voice-recognition training would be from the land-line phone and for VOIP use, the voice recognition training would be from the VOIP phone.

If a user uses multiple devices, such as a mobile handset and a land-line phone, the voice-recognition training set for the mobile handset is used for mobile handset calls, and the voice recognition training set for the land-line phone is used for land-line calls, etc.

The limiting factor for telephony based speech recognition is the bandwidth at which speech can be transmitted. For example, a standard land-line telephone only has a bandwidth of 64 kbit/s at a sampling rate of 8 kHz and 8-bits per sample (8000 samples per second×8-bits per sample=64000 bit/s). Therefore, for telephony based speech recognition, one needs acoustic models trained with 8 kHz/8-bit speech audio files.

In the case of Voice over IP, the codec determines the sampling rate/bits per sample of speech transmission. If one uses a codec with a higher sampling rate/bits per sample for speech transmission (to improve the sound quality), then the acoustic model must be trained with audio data that matches that sampling rate/bits per sample.

Speech signals, i.e., signals intended to carry only human speech can usually be sampled at a much lower rate. For most phones, most of the energy may be within the 5 Hz-4 kHz range, allowing a sampling rate of 8 kHz. This is the sampling rate used by nearly all telephony systems, which use the g.711 sampling and quantization specifications.

The present invention can do speech recognition on both of the audio streams, i.e., the audio stream 330 of the phone user and the audio stream 340 of the other party.

To use the trained vocabulary for each speaker, the present invention should determine the identification of the speaker, and transmit the speaker identification to the speech recognition engine.

To determine the identification of the user, the caller ID and address book may be used in order to identify incoming calls, if caller ID is available. For outgoing calls, the address book may be used, since the phone user presumably knows who they are calling.

However, for incoming calls, the other party may call from multiple phone numbers over a period of time, thus the present invention stores the various phone numbers that the other party has called from or could call from.

Also, one phone number can be used by multiple different callers, such as roll over lines from a business, or just different people using the same phone number.

Thus, the phone number may be just one clue as to the identity of the other speaker.

The present invention may use the speech recognized text of the start of the call as a further clue. For example, someone may call and the phone user could say "hello" and the other party could say "Hello Jim, this is Bob Smith (or perhaps just Bob)", and the phone user could say "Hello Bob" or "Hello Bob Smith"

At the end of the conversation, the phone user may be prompted for the opportunity to speak a short synopsis.

If the speech recognition is being done in real time with the Phone, the present invention queries the phone user with "Was this Bob Smith or instead Bob Jones", if the phone user had said "Hello Bob", and Bob Smith and Bob Jones were the only two Bob's trained for voice recognition.

Once a caller is first identified to the system, a voice print of the caller's first few words of the call, such as 'Hello Jim' are saved, and this voice print can be used to help identify the caller, the next time that he calls.

The speech recognition engine 140 reads the audio and produces text transcript 360. The text includes, for each word, a timestamp with the time spoken, relative to the start of the audio, and a confidence level, for an assumed accuracy of each word.

The phone-user's text transcript 360 is examined for clues as to the identity of the other party (such as Hello Bob Smith), and this is used with other clues, such as the address book and phone number of the other party, to identify the other party so that a previously trained vocabulary for the other party can be used in speaker-dependent speech recognition, to produce other party text transcript 370.

After speech recognition, the text transcript 360 of the phone user and the text transcription 370 of the other party is merged, using the timestamps for each word to synchronize the text, into one Merged Conversation text transcript 380. The Merged Conversation text transcript 380 shows the full text of the conversation, and shows who is speaking, for each change in speaker.

Digital audio is a sequence of numbers, e.g., 8,000 8 bit bytes per sample, with each byte encoding the amplitude of the audio. The frequency of the audio may not be explicitly encoded in these numbers; alternatively, the frequency may be encoded instead in the sequence and periodicity of these number (i.e., the variation in the amplitude (y axis) over time (x axis)

Therefore, the decompressed audio stream 330 for the phone user and the decompressed audio stream 340 for the other party can be combined into one Merged Conversation Audio Stream 350, containing both speaker's voice, by adding the numbers and normalizing for volume and normalizing for the different sampling rates used by each speaker's audio stream.

The time duration of the Merged Conversation Audio Stream 350 may be the greater of the durations of audio streams 330 and 340.

The ability to hear the spoken word may be important because speech recognition is not 100% correct, and if a user sees gibberish in the text, the user can alternatively hear the actual audio.

The present invention may store the "confidence level of correctness" provided by the speech recognition engine with each word in the speech-recognized text transcript.

The present invention uses this confidence level to indicate to the user they may be reading lower confidence recognized words, and the user may want to click the actual text words to hear the audio of that word and the surrounding words.

The indication of the confidence level may be displayed, e.g., by putting the text in different colors, using yellow for medium-level-of-confidence words, and red for low-level-of-confidence words, with the levels being user configurable.

The call start date 127*a* and call start time 127*b* may be added to the relative timestamp 380*a* for each word in Merged Conversation Text Transcript 380 to produce Merged Conversation Time-Text transcript 381 with an absolute date/timestamp for each word, so that you have a text word, a relative time offset, and an absolute date/time for each word.

The call location coordinates 127*m*1, 127*m*2, . . . 127*mn* read from metadata 127 may be added next to each word in the Merged Conversation Time-Text transcript 381 to produce the Merged Conversation Time-Location Text 382, to provide for the user time-location stamps for each word, i.e., to provide a record of not just where, in the audio file, each word can be found, but where the phone user was when the phone user spoke each word.

In order to simplify searching, so that there is only one searchable text document for each call or dictation, the Merged Conversation Time-location Text 382 is appended to the end of the synopsis time-location text transcript 162 to produce the appended time-location transcript 383.

The appended time-location transcript 383, merged conversation audio stream 350, synopsis audio 122, video 124, photos 125, and metadata 127 may be transmitted from the computer server 130 or onboard phone processor 130*p* via the Internet or intranet to the email system 170*a* or Search Database 170*b* of the user.

Each appended time-location transcript 383 may be one email or one document, and the user can use the search facilities provided by their email system or the Search Database to search and view the appended time-location transcript 383, and click to hear the merged conversation audio stream 350.

Figure 4:
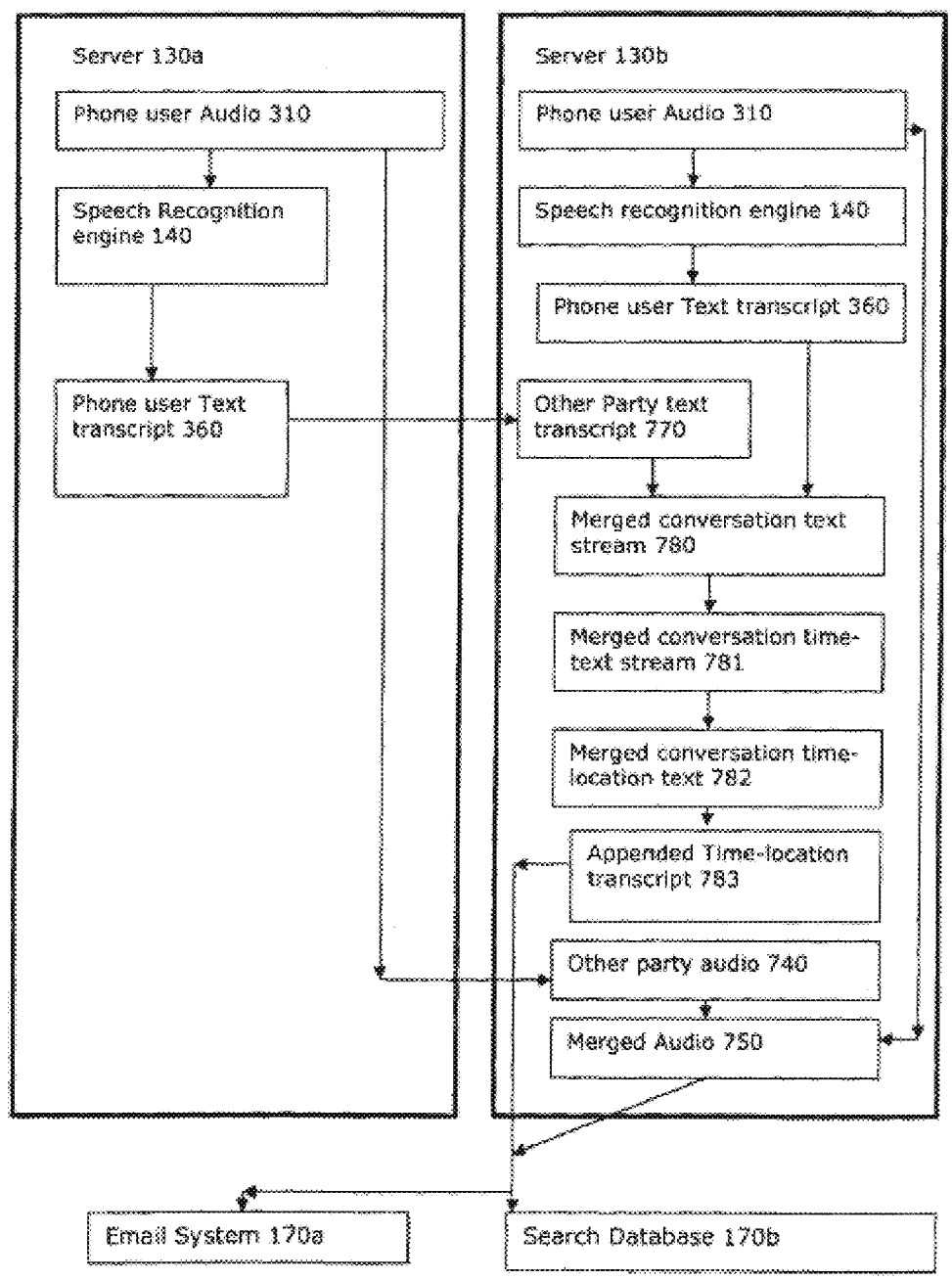
FIG. 4 illustrates sharing of speech-recognized text and optionally audio between both (or multiple) parties to the call, to increase the accuracy of speech-recognized text for both (or all) parties to the call.

As shown in FIG. 4, if both parties to the call are using the present invention, and both parties agree to share phone call data, the present invention may send each user's speech recognized text transcript, and optionally audio as well, to the other user.

For example, if Sierra Lewis is talking with Bob Smith, and Sierra Lewis does not have Bob Smith trained in her speech recognition engine and Bob Smith does not have Sierra Lewis trained in his speech recognition, then Sierra Lewis should have a more accurate text transcript of her words than Bob has, and vice-versa.

This is because Sierra Lewis has trained her speech recognition for her speech, and also because her speech is recorded from the microphone, instead of from a lower quality voice channel over, e.g., a cell phone connection.

Thus, assuming both users are using the present invention, the more accurate text transcript 360 is transmitted from the server 130a of the first user to the server 130b of the second user (it could be the same server or a different server), producing other party text transcript 770. The better quality compressed audio 310 can also be sent to the server of the first user, and uncompressed into audio 740 of the second user.

On the server 130b of the second user, the more accurate other party text transcript 770 is merged with the text transcript 360, using the timestamps for each word to synchronize the text, and the merged conversation text stream text 780 is generated.

Also, the higher-quality audio 740 of the second user can be merged with the audio 310 of the first user, to produce merged audio 750.

In order to simplify searching, so that there is only one searchable text document for each call or dictation, the Merged Conversation Time-location Text Transcript 782 is appended to the end of the synopsis time-location text transcript 162 to produce the appended time-location transcript 783.

The appended time-location transcript 783, Merged Audio 750, synopsis audio 122, video 124, photos 125, and metadata 127 may be sent to the email system 170a or Search Database 170b of the user, and the user can search this information.

The less accurate version of the conversation could be automatically deleted from the email system or Search Database of the phone user.

Since the confidence level for the speech is calculated by the speech recognition engine, an average confidence level for the entire text of each user's side of the conversation can be used to determine which party has the most accurate version of the text, and thus which party should send the text to the other party.

This could be used instead of assuming that each phone user has the most accurate recognized text of their side of the call.

Audio-visual speech recognition is a technique that uses image processing capabilities and lip reading to aid speech recognition.

Taking advantage of the phone video capabilities, the video of the speaker's face (during the conversation) can be sent from the phone and used by the speech recognition engine for lip reading to give better speech recognition results.

Figure 5:
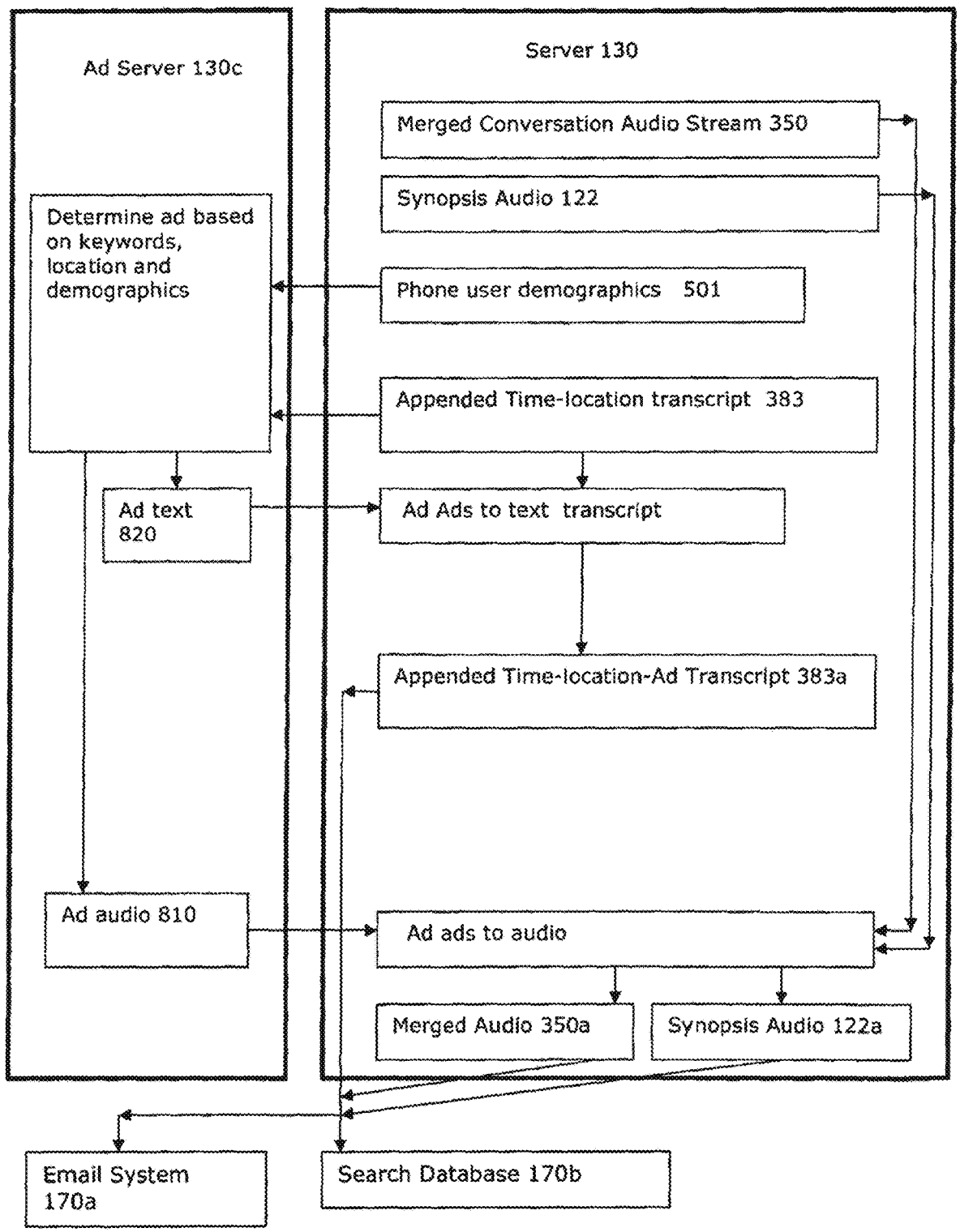
FIG. 5 illustrates an advertising supported version of product.

As shown in FIG. 5, for users desiring an ad-supported service, instead of a subscription-based service, the present invention may provide for targeted ads. The present invention may use the speech-recognized text, to target the ad to something (a keyword) mentioned one or more times in the conversation.

Also, the present invention may use the user-provided (or phone company provided) demographics of the Phone user to target the ad, including age, sex, income, job title, interests, etc.

The location of the phone user may also be used to target the ad.

Since the location coordinates may be added to the timestamp in the text transcripts, the text transcripts may have a record of where the user was when the user spoke each word.

This location-spoken data may be used, e.g., in the selection of ads to present to the user. If the phone user is discussing a 100 inch Panasonic flat panel TV, the presented ad may be an ad for the store nearest the user, at the time the user mentioned the 100 inch Panasonic TV.

On the server 130, the appended time-location transcript 383 is sent to an Ad Server 130c where the most appropriate ad is determined, based on keywords, the location of the phone user when each keyword was spoken, and the demographics 501 of the phone user. The ads are then "presented" to the user.

The ads can be "presented" by prefixing the ad audio 810 to the merged conversation audio stream audio 350, generating the Merged audio 350a and prefixing the ad audio 810 to the synopsis audio 122, giving Synopsis audio 122a.

The ad text 820 may contain relative offsets of the position where each word is in the related ad audio 810.

The ad may also be "presented" by prefixing the ad text 820 to the appended time-location transcript 383, and adding the time duration of Ad audio 810 to the relative-time timestamps in the appended time-location transcript 383, so each text word will still have the correct relative time offset to the same word in the audio. This may provide an appended time-location-ad transcript 383a.

Similarly, if the speech recognition is done on the phone instead of a server, the appended text transcript 253 may be searched for ad keywords. If one or more keywords are found, ads relevant to these keywords may be "presented" to the user.

Also, the user may be able to see the ad text on their phone or hear the ad audio before they are allowed to record their call synopsis.

The appended time-location-ad transcript 383, Merged Audio 350a, synopsis audio 122a, video 124, photos 125, and metadata 127 are sent to the email system 170a or Search Database 170B of the user, and the user can search this information.

The present invention provides for a user-specified configuration, such that the user may select which, if any, of the following are to be sent to the user's email system or Search Database, including Call audio of just the first user's side of the conversation, Call audio of just the second user's side of the conversation, Call audio of both the first user and a second user's sides of the conversation, call audio of synopsis, call metadata (such as phone number and time of call), voice recognized text of each side of conversation, voice recognized text of synopsis, photos, video, text messages, etc.

Figure 6:
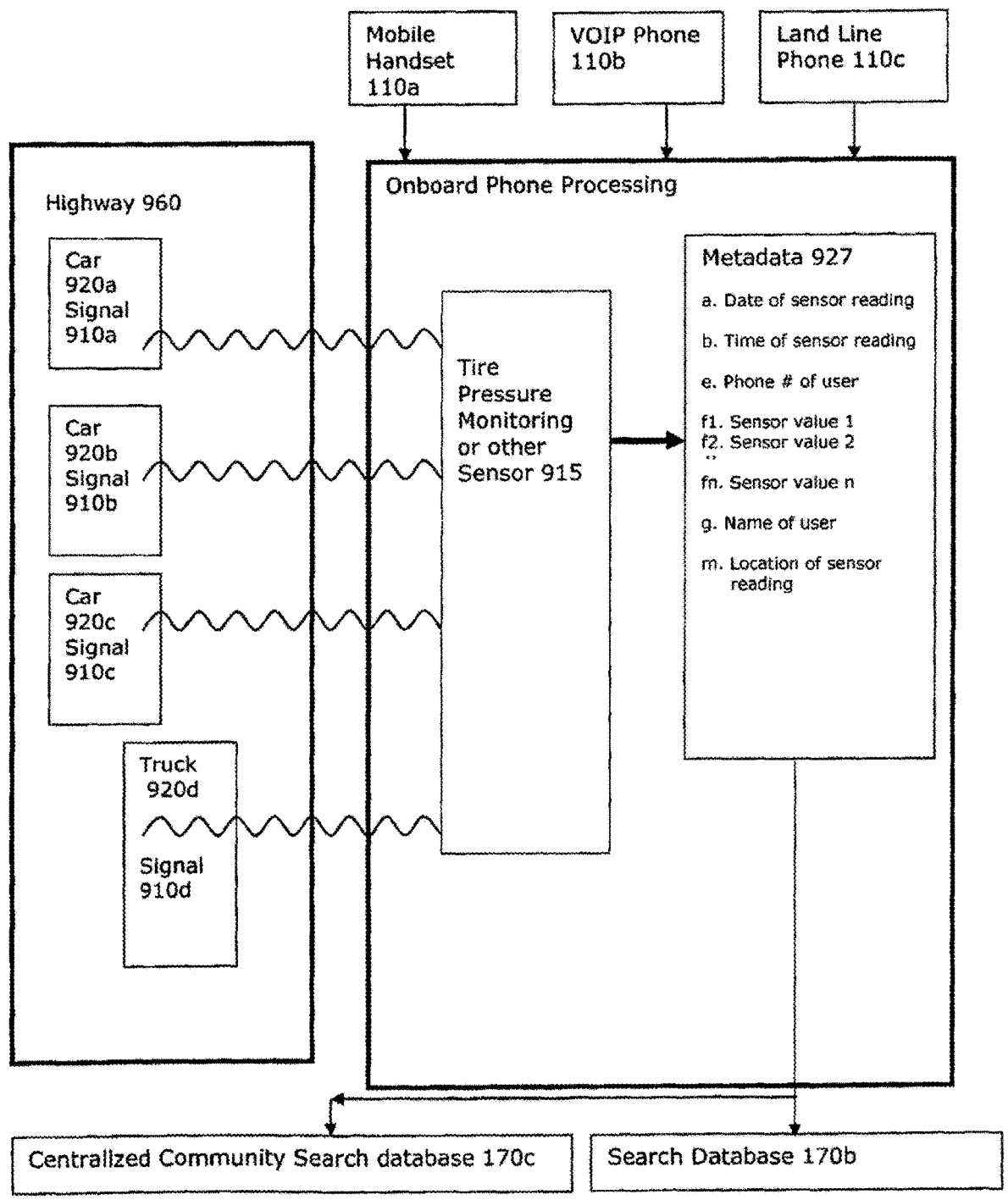
FIG. 6 illustrates the use of a multiple mobile Phones for rolling surveillance by detecting tire pressure monitoring signals of adjacent vehicles.

As shown in FIG. 6, the data sent from the Phone to a searchable repository may also include data picked up by using the Phone as a sensor, e.g., to record and transmit wireless data from another Phone or an adjacent automobile. This could be useful for rolling ad-hoc surveillance of vehicles or people.

For example, all new vehicles are mandated to have a tire pressure monitoring system (TPMS), in which each tire periodically sends a wireless signal to the vehicle to which the tires are mounted.

To differentiate between its own wheels and wheels of the vehicle in the next lane, each TPMS sensor may include a unique id, for each vehicle. The majority of TPMS sensors may transmit information in clear text using the assigned approximate and by example radio frequencies 315 MHz or 433 MHz.

The Phone, if equipped with the appropriate sensor 915, may automatically record the TPMS unique vehicle ID 910 from passing vehicles 920, and send this data, with the metadata location 927m and date of sensor reading 927a and time of sensor reading 927b to the Search Database 170b or Centralized Community Search database 170c.

The Centralized Community Search database may be one maintained by a central service, such as the government, so the central service could map the locations where all "detected" vehicles were at any time they were detected.

The phone sensor may also detect and record Bluetooth signals from adjacent vehicles or phones, or "drive by wireless" signals in vehicles.

If a sufficient number of people in a community used their Phone to record and transmit TMPS data from passing cars, this may be useful for a rolling ad-hoc surveillance of vehicles or people.

In addition to TMPS data, Phone users may choose to transmit their text messages, photos, videos, call and voice annotations or synopsis (with speech-recognized text and location data), to a Centralized Community Search database.

The default operation for the phone for the present invention may be for the recorded speech and other content to be labeled private, so only the Phone user can access it, but the Phone user may designate certain of the content to be public, to be shared with anyone via the Internet, in what we call Location Blogging.

This could also be called a community or collective photographic memory, where the content is contributed by multiple members of the community.

For example, if there is a traffic jam, or a hazard in the road, such as a stalled vehicle, or a driver driving the wrong way on the Interstate, the Phone user can send a voice message with speech-recognized text, and location data for each word, to a Centralized Community Search database. This could also include a photo or video attachment.

The Location Blog could be a review of a restaurant or business.

The Location Blogs may be positioned on a spatial platform, such as Google Maps. An Internet user may zoom into any part of this map, and browse content originating from any region.

The Centralized Community Search database of Location Blogs (with speech-recognized text and location data) may be searched or mined based on social network or type of information, such as "Urgent Road Warnings" when driving or "Best Menu Choice" at a restaurant location.

The Centralized Community Search database may show all Location Blogs for the Phone user's current location, and may be ranked by any one or combination of ranking factors, such as distance from the Phone user's current location and the location of the original Location Blog poster, such as 10 feet, 100 feet, 1,000 feet, 10,000 feet, etc.

Other search ranking factors, used alone or in combination may include reverse chronological order, social network credibility or social network popularity of the Location Blog poster, and type of data (e.g., Urgent Road Warning versus restaurant ratings).

Ranking the Location Blogs by the credibility of the poster may be one way to lessen the impact of spam or inaccurate postings or warnings. Another way is the approach taken by Wikipedia, where anyone can post but anyone else can delete a post, i.e., everyone is a system moderator.

Also, certain people could be appointed as moderators, based on their social network credibility. Or, for hazard warnings, the moderators could be public safety first responders in the community.

Referencing FIG. 2, for calls and dictation, the appended time-location transcript 253, along with attached call audio 121, attached synopsis audio 122, attached video 124, attached photos 125, and metadata 127 which may be recorded on or streamed live from Mobile Handset Phone 110a, Voice Over IP (VOIP) Phone 110b or land line phone 110C may be transmitted via the Internet or intranet, e.g., using TCP/IP for nearly lossless or at least high-quality data transmission, to the Centralized Community Search database, FIG. 6, 170c.

Referencing FIG. 2, for text messages, the text message 126, along with the attached video 124, attached photos 125, and metadata 127 which may be recorded on or streamed live from Mobile Handset Phone 110a, Voice Over IP (VOIP) Phone 110b or land line phone 110c may be transmitted via the Internet or intranet, e.g., using TCP/IP for lossless or at least high-quality data transmission, to the Centralized Community Search database, FIG. 6, 170c.

The Location Blogs could be used with onboard speech recognition (FIG. 2) or with server based speech recognition (FIG. 1).

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed.

What is claimed is:

1. A system for presenting location-based information to a mobile electronic device dependent on its location, comprising:
   a communication network interface port;
   a database system, configured to automatically store and retrieve location-based information for a traveler, the location-based information comprising location-based travel information and location-based advertisements; and
   at least one server having at least one automated processor, configured to:
   automatically control access to the database system, to store and retrieve the location-based information;
   automatically receive a location from a mobile electronic device;
   automatically receive location-based information from the mobile electronic device;
   automatically retrieve location-based travel information from the database system dependent on the received location of the mobile electronic device;
   automatically retrieve a location-based advertisement from the database system dependent on at least the received location of the mobile electronic device and relevant to at least one spoken keyword; and automatically present the retrieved location-based advertisement to a user of the mobile electronic device.

2. The system according to claim 1, wherein the at least one server is further configured to retrieve the location-based advertisement from the database system dependent on at least the received location of the mobile electronic device and a prior communications from the mobile electronic device.

3. The system according to claim 1, wherein the communication network interface port is configured to interface to the Internet, and the mobile electronic device comprises a cellular telephone.

4. The system according to claim 3, wherein the location received from the mobile electronic device is global positioning satellite data.

5. The system according to claim 1, wherein the received location-based travel information comprises traffic information.

6. The system according to claim 1, Wherein the received location-based travel information comprises road hazard information.

7. The system according to claim 1, wherein the transmitted location-based travel route information is configured to trigger a voice message to a user of the mobile electronic device.

8. The system according to claim 1, wherein the transmitted location-based travel route information is configured to display a warning icon on a GPS map of the mobile electronic device.

9. The system according to claim 1, wherein the database system is further configured to store an image and associated location of the image.

10. The system according to claim 1, wherein the at least one server is configured to receive a search query through the communication network interface port, search the database system based on the search query, receive a response to the query from the database system, and transmit the response through the communication network interface port.

11. A method for presenting location-based information to a mobile electronic device dependent on its location, comprising:

providing a database system, for storing and retrieving location-based information for a traveler, the location-based information comprising location-based travel information and location-based advertisements;

receiving a location from a mobile electronic device with at least one server through a communication network interface port;

receiving location-based information from the mobile electronic device through the communication network interface port;

retrieving location-based travel information from the database system dependent on the received location of the mobile electronic device;

retrieving a location-based advertisement from the database system dependent on at least the received location of the mobile electronic device and relevant to at least one spoken keyword; and presenting the retrieved location-based advertisement to a user of the mobile electronic device presenting the retrieved location-based advertisement to a user of the mobile electronic device.

12. The method according to claim 11, wherein the at least one server further retrieves the location-based advertisement from the database system dependent on at least the received location of the mobile electronic device and a prior history of communications from the mobile electronic device.

13. The method according to claim 11, Wherein the communication network interface port is an interface to the Internet, the mobile electronic device comprises a cellular telephone, and the location received from the mobile electronic device is global positioning satellite data.

14. The method according to claim 11, Wherein the received location-based travel information comprises information selected from the group consisting of one or more of: traffic information; and road hazard information.

15. The method according to claim 11, wherein the transmitted location-based travel route information triggers a voice message to a user of the mobile electronic device.

16. The method according to claim 11, wherein the transmitted location-based travel route information displays a warning icon on a GPS map of the mobile electronic device.

17. The method according to claim 11, wherein the database system stores images and respective associated locations for each image, and retrieves the stored image based on the received location from the mobile electronic device.

18. The method according to claim 11, wherein the at least one server receives a search query through the communication network interface port, searches the database system based on the search query, receives a response to the query from the database system, and transmits the response through the communication network interface port.

19. The method according to claim 11, wherein the response to the query from the database system is transmitted to a different mobile electronic device from which it is received.

20. The method according to claim 11, further comprising:

receiving words through the communication network interface port;

storing the words in the database as a document; and retrieving the document dependent on at least the location.

21. The method according to claim 11, further comprising:

receiving words and an associated location through the communication network interface port from the mobile electronic device storing the received words and associated location in the database; and retrieving the words from the database dependent on at least a location query.

22. A computer readable medium storing, instructions therein for causing a programmable processor to present location-based information to a mobile electronic device dependent on its location, comprising:

instructions to cause a database system to store and retrieve location-based information for a traveler, the location-based information comprising location-based travel information and location-based advertisements;

instructions to receive a location from a mobile electronic device through a communication network interface;

instructions to receive location-based information from the mobile electronic device through the communication network interface;

instructions to retrieve location-based travel information from the database system dependent on the received location of the mobile electronic device;

instructions to retrieve a location-based advertisement from the database system dependent on at least the received location of the mobile electronic device and relevant to at least one spoken keyword; and
instructions to present the retrieved location-based advertisement to a user of the mobile electronic device.

\* \* \* \* \*